(12) United States Patent
Kasajima et al.

(10) Patent No.: US 7,079,356 B2
(45) Date of Patent: Jul. 18, 2006

(54) HEAD ARM ASSEMBLY AND DISK DRIVE APPARATUS WITH THE HEAD ARM ASSEMBLY

(75) Inventors: Tamon Kasajima, Kwai Chung (HK); Masashi Shiraishi, Kwai Chung (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 74 days.

(21) Appl. No.: 10/633,566

(22) Filed: Aug. 5, 2003

(65) Prior Publication Data
US 2004/0042123 A1    Mar. 4, 2004

(30) Foreign Application Priority Data
Aug. 27, 2002 (JP) .............................. 2002-247170

(51) Int. Cl.
*G11B 5/48* (2006.01)
(52) U.S. Cl. .................................................. 360/244.2
(58) Field of Classification Search ............. 360/244.2, 360/266.1, 98.01, 294.7
See application file for complete search history.

(56) References Cited

U.S. PATENT DOCUMENTS

| | | | |
|---|---|---|---|
| 5,786,961 A * | 7/1998 | Goss | 360/245.1 |
| 6,151,197 A * | 11/2000 | Larson et al. | 360/255 |
| 6,229,677 B1 * | 5/2001 | Hudson et al. | 360/266.1 |
| 6,614,625 B1 * | 9/2003 | Kuwajima et al. | 360/244.2 |
| 6,765,759 B1 * | 7/2004 | Bhattacharya et al. | 360/244.2 |
| 6,771,469 B1 * | 8/2004 | Lindrose | 360/244.2 |
| 2002/0097514 A1 * | 7/2002 | Boutaghou | 360/31 |

* cited by examiner

*Primary Examiner*—William Klimowicz
*Assistant Examiner*—Mark Blouin
(74) *Attorney, Agent, or Firm*—Buchanan Ingersoll PC

(57) ABSTRACT

An HAA includes a head slider having at least one head element, a high-stiffness arm member for supporting the head slider at one end section, an actuator, mounted to the other end section of the arm member, for rotationally moving the arm member in a direction substantially parallel with a recording medium surface around a horizontal rotation axis of the arm member, and a resilient plate spring for generating a load, the plate spring having one end section fixed to the arm member and the other end section provided with a load point for energizing the head slider in a direction to the recording medium surface.

12 Claims, 5 Drawing Sheets

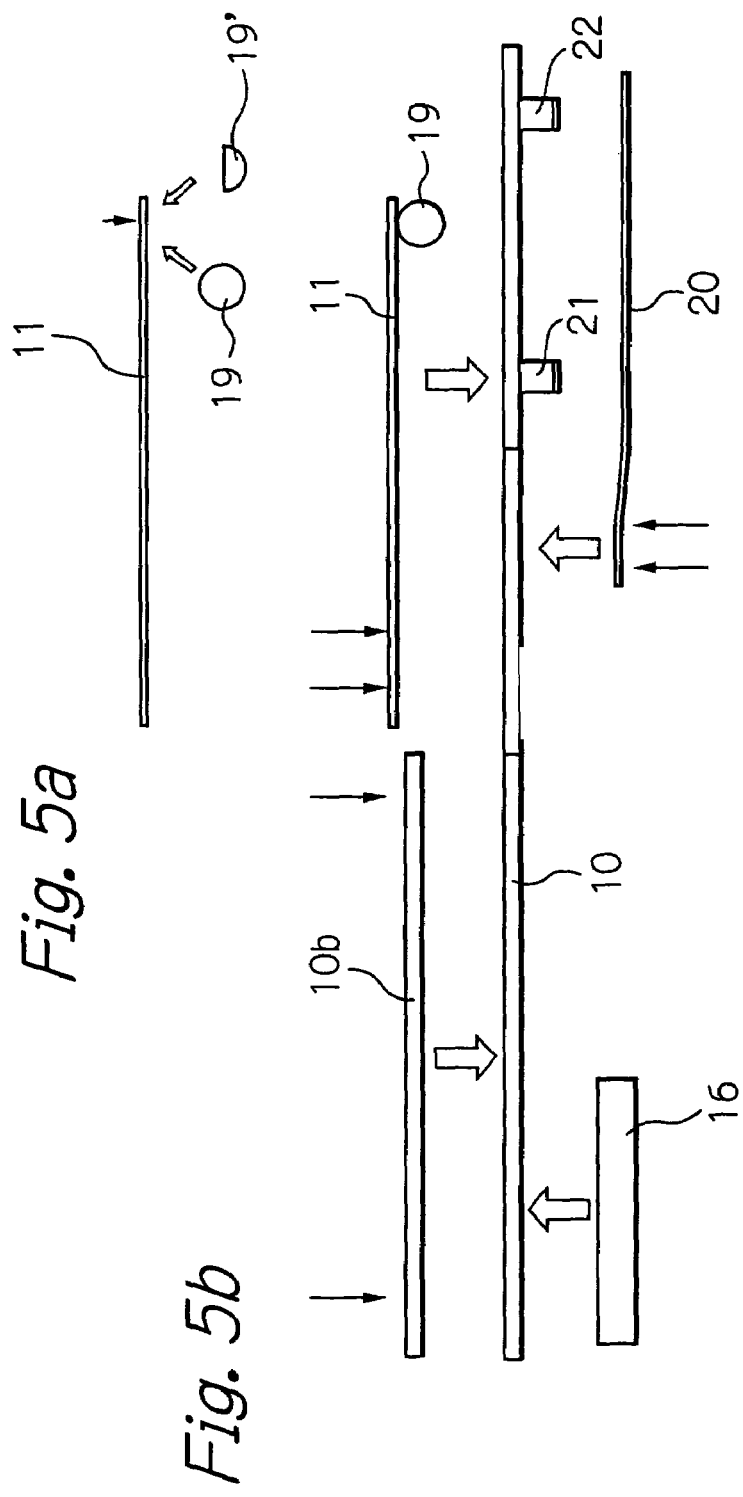

HEAD ARM ASSEMBLY AND DISK DRIVE APPARATUS WITH THE HEAD ARM ASSEMBLY

FIELD OF THE INVENTION

The present invention relates to a head arm assembly (HAA) provided with a write and/or read head such as a flying thin-film magnetic head or a flying optical head, and to a disk drive apparatus with the HAA.

DESCRIPTION OF THE RELATED ART

In a magnetic disk drive apparatus, at least one thin-film magnetic head element for writing magnetic information into and/or reading magnetic information from a magnetic disk is in general formed on a magnetic head slider flying in operation above the rotating magnetic disk. The slider is supported at a top end section of an HAA.

A conventional HAA has a support arm having high rigidity, a voice coil motor (VCM) that is an actuator to rotationally move this support arm in parallel with a magnetic disk surface, a suspension having elasticity fixed to a tip end of the support arm, and a magnetic head slider mounted to a top end section of the suspension, and it is constructed so that a load applied to the magnetic head slider in a direction toward the magnetic disc surface is generated by a plate spring provided at the suspension itself or by a plate spring provided at a connecting section of the suspension and the support arm.

In the HAA with the conventional structure as described above, the magnetic head slider is mounted to the suspension at the tip of the plate spring, and therefore when an impact is applied thereto from outside, there is a fear that the magnetic head slider is strongly vibrated and collided against the magnetic disk surface, and gives a damage to the disk surface.

A typical HAA is constituted by a magnetic head slider, a load beam of a plate spring having some elasticity, a base plate and a bending section formed at a midpoint of the plate spring near the base plate so as to adjust a load applied to the magnetic head slider. More concretely, in the typical HAA, the bending section for somewhat bending the top end section of the load beam, namely the magnetic head slider, toward a disk surface is formed at the midpoint of the load beam of the suspension and the load applied to the magnetic head slider is adjusted in accordance with a bending angle of the bending section.

However, if such bending section is formed at the load beam, a resonance frequency of the suspension as a whole will greatly decrease due to the complex shape of the load beam and the bending section. Thus decreased resonance frequency will be contained within a frequency range for a servo mechanism such as the VCM and therefore high speed operation of the servo mechanism cannot be expected.

Also, in case that the bending section is formed in the load beam, an influence of windage (i.e., wind resistance) becomes large and cannot be negligible. That is, under the influence of lateral wind generated by the high speed rotation of the magnetic disk and applied to this bending section of the suspension, irregular vibrations may sometimes occur in the suspension. Particularly, in a recent high end magnetic head drive apparatus in which a magnetic disk will rotate at a high speed of 10,000 to 15,000 rpm or more, this influence of windage is very large.

Further, due to a poor stiffness of the bending section, the top end section of the suspension will receive extremely large stroke when an up and down direction (Z direction) impact is applied. Therefore, a resistance of the conventional HAA as a whole against the impact is very low.

In addition, according to the HAA with the conventional structure, since the load is adjusted by controlling a bending angle of the bending section, adjusting of the load becomes complicated and also it is impossible to expect a high accuracy in the load adjustment. Particularly, since the lighter in the weight of the magnetic head slider, the lower in the load, small variations in the adjusted load becomes important to neglect and thus a tolerance in the load becomes large.

SUMMARY OF THE INVENTION

It is therefore an object of the present invention to provide an HAA and a disk drive apparatus, whereby a resonance frequency of the HAA can be increased.

Another object of the present invention is to provide an HAA and a disk drive apparatus, whereby a windage performance of the HAA can be improved.

Further object of the present invention is to provide an HAA and a disk drive apparatus, whereby a resistance of the HAA against a Z-direction impact.

Still further object of the present invention is to provide an HAA and a disk drive apparatus, whereby a tolerance in the load can be decreased and manufacturing processes of the HAA can be simplified.

According to the present invention, an HAA includes a head slider having at least one head element, a high-stiffness arm member for supporting the head slider at one end section, an actuator, mounted to the other end section of the arm member, for rotationally moving the arm member in a direction substantially parallel with a recording medium surface around a horizontal rotation axis of the arm member, and a resilient plate spring for generating a load, the plate spring having one end section fixed to the arm member and the other end section provided with a load point for energizing the head slider in a direction to the recording medium surface. Also, according to the present invention, a disk drive apparatus includes at least one information recording disk, and at least one above-mentioned HAA.

A resilient plate spring for generating a load applied to the head slider is separately prepared and fixed to a rigid arm member. Thus, a bending section for generating a load, which is usually formed at the load beam of the conventional suspension, is unnecessary and therefore it is possible to provide a high stiffness aim member by merging the load beam with the support arm. This structure will increase a resonance frequency of the whole suspension and thus a frequency range for a servo mechanism can be broadened. As a result, high speed operation of the servo mechanism can be expected. Since the arm member that has the largest side area is formed in the high rigidity structure with no bending section for generating a load, the influence of lateral wind generated by the high speed rotation of the magnetic disk can be minimized. Particularly, in a recent high end magnetic head drive apparatus in which a magnetic disk will rotate at a high speed of 10,000 to 15,000 rpm or more, this feature is very advantageous. Also, because the arm member has no bending section for generating a load and thus has a high stiffness, it is possible to extremely improve a resistance against a Z-direction impact. Further, since the number of components for assembling the HAA is reduced, not only the manufacturing process can be simplified to reduce the manufacturing cost but also the load can be precisely adjusted to reduce a tolerance in the load.

It is also preferred that the HAA further includes a flexure with one end section fixed to the arm member, the flexure having a resilience for determining flying attitude of the head slider.

It is preferred that the one end section of the plate spring is fixed to a first surface of the arm member, a second surface of the arm member facing the recording medium surface, and that the one end section of the flexure is fixed to the second surface of the arm member.

It is further preferred that the horizontal rotation axis is provided at a horizontal bearing section located at a midpoint of the arm member, and that the horizontal bearing section has a structure for adjusting a distance between the arm member and the recording medium surface. Since the resilient plate member is formed short in its whole length in order to increase its resonance frequency, it is difficult to adjust the Z-height by this plate member. However, if such Z-height adjustment structure is provided in the horizontal bearing section, it is possible to perform easy Z-height adjustment with reference to an upper surface of the recording medium. Thus, easy compensation of deviations or tolerances due to assembly of the actuator into the disk drive apparatus, a height of the actuator, thickness of a spacer or the recording medium, assembly of the horizontal bearing section into the disk drive apparatus, and a height of the horizontal bearing section itself can be expected.

It is also preferred that the at least one head element comprises at least one thin-film magnetic head element.

Further objects and advantages of the present invention will be apparent from the following description of the preferred embodiments of the invention as illustrated in the accompanying drawings.

BRIEF DESCRIPTION OF THE DRAWINGS

FIGS. 5a to 5c show sectional views illustrating an assembly process of the HAA in the embodiment of FIG. 2.

DESCRIPTION OF THE PREFERRED EMBODIMENTS

Figure 1:
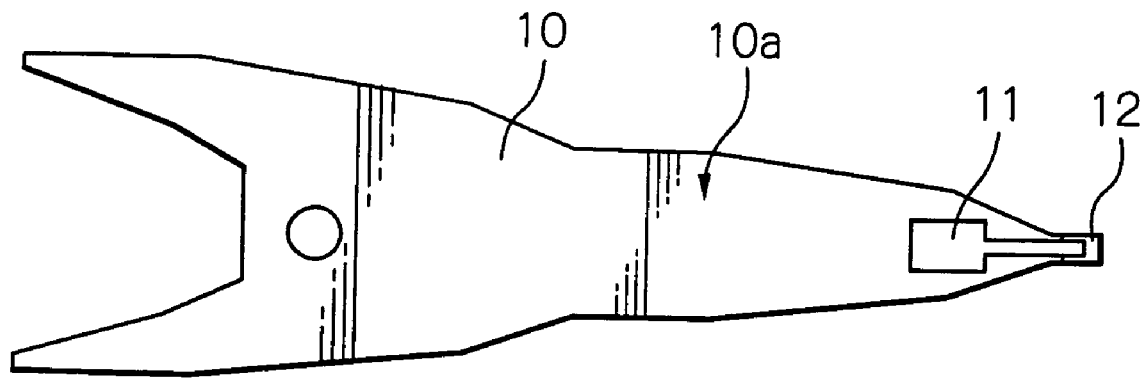
FIG. 1 shows a plane view of an HAA illustrating a basic configuration of the present invention.

FIG. 1 illustrates a basic configuration of the present invention.

As shown in the figure, an HAA according to the present invention includes an arm member 10 with a high rigidity structure, a plate spring 11 for generating a load, and a magnetic head slider 12 with at least one thin-film magnetic head element. A coil of a voice coil motor (VCM) that is an actuator to rotationally move the arm member in parallel with a magnetic disk surface will be attached to a back end section of the arm member 10. The plate spring 11 is arranged only at a top end section of the arm member 10. The magnetic head slider 12 is mounted to the top end section of the arm member 10.

The arm member 10 is constituted by extending frontward a conventional support arm to form an integral structure of the extended support arm and parts of a suspension, such as a base plate and a load beam. Therefore, the arm member 10 has no swaging part for attaching the suspension to the support arm resulting its thickness to decrease. Due to the high rigidity structure, mechanical resonance occurred in the conventional suspension is not generated in the arm member 10. By spreading a width of a middle section 10a of this arm member 10, flexibility in HAA design and resistance of the HAA against impact can be improved.

Since the plate spring 11 is short in its length and has only a protrusion (dimple) constituting a load application point at it top end section, it is possible to have a very high resonance frequency.

Figure 2:
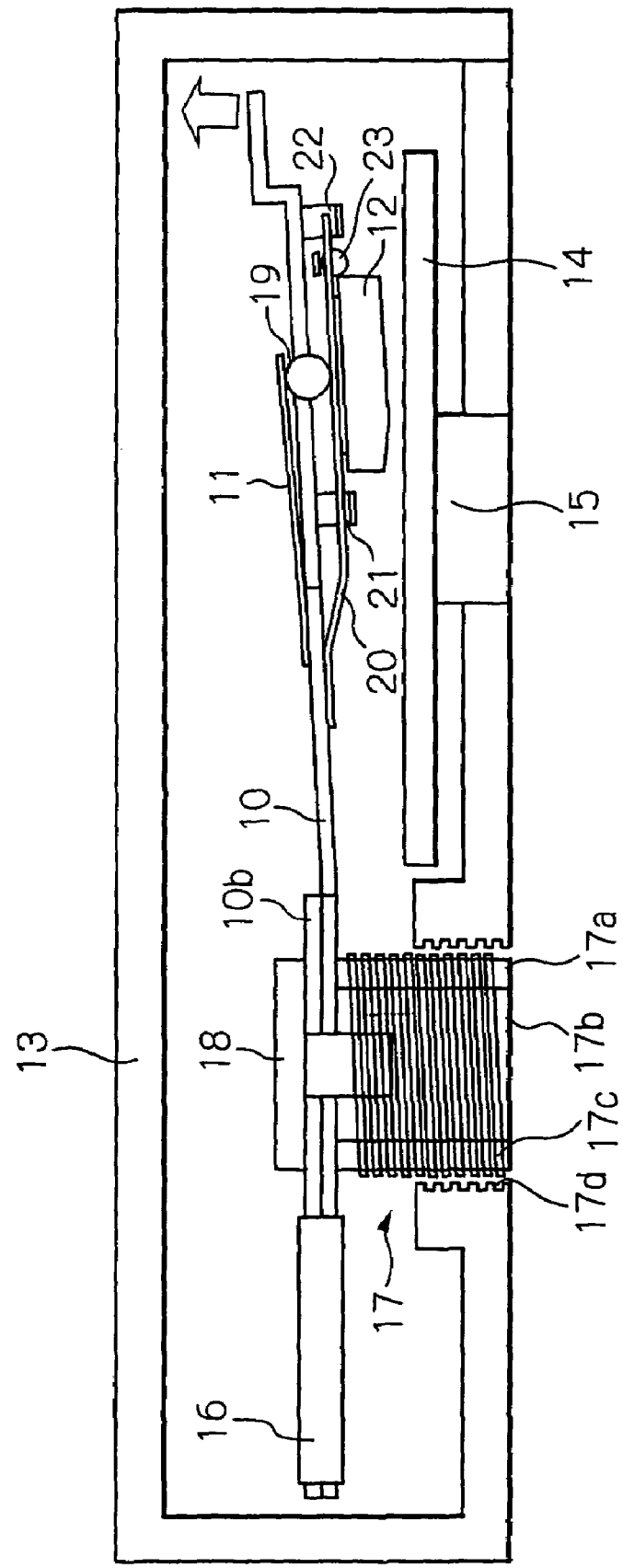
FIG. 2 shows a sectional view schematically illustrating whole of a magnetic disk drive apparatus as a preferred embodiment according to the present invention.
Figure 3:
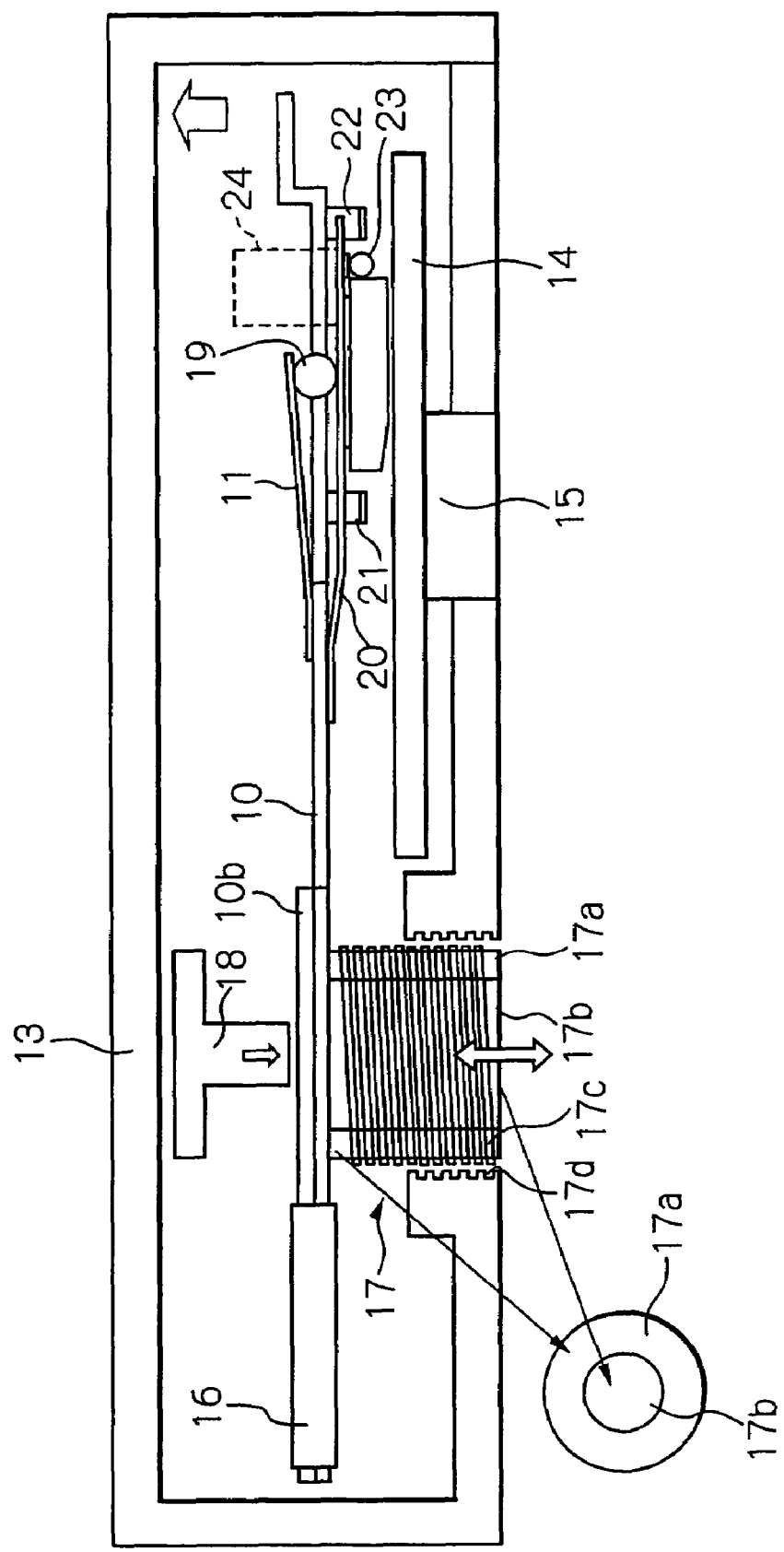
FIG. 3 shows a sectional view illustrating assembling of an HAA with magnetic disk drive apparatus in the embodiment of FIG. 2.

FIG. 2 schematically illustrates whole of a magnetic disk drive apparatus as a preferred embodiment according to the present invention, and FIG. 3 illustrates assembling of an HAA with magnetic disk drive apparatus in the embodiment of FIG. 2.

In these figures, reference numeral 13 denotes a housing of the magnetic disk drive apparatus, 14 denotes a magnetic disk capable of rotating at a high speed around an axis 15, 16 denotes a coil of a VCM attached to a back end section of the arm member 10, 17 denotes a horizontal bearing mechanism capable of rotationally moving the arm member 10 in a direction parallel with the surface of the magnetic disk 14, 18 denotes a screw for attaching the arm member 10 to the bearing mechanism 17, 19 denotes a dimple ball fixed to the top end section of the plate spring 11, 20 denotes a resilient flexure, and 21 and 22 denote limiters, respectively. A base part of the plate spring 11 is fixed to one surface of the arm member 10, opposite to the other surface that faces the magnetic disk. The top end of the plate spring 11 is a free end. A base part of the flexure 20 is fixed to the other surface of the arm member 10, and a top end of the flexure 20 is a free end. The magnetic head slider 12 is mounted to the top end section of the flexure 20. The limiters 21 and 22 restrain the flexure 20 on which the magnetic head slider 12 is mounted from popping up toward the surface of the magnetic disk 14.

The arm member 10 is constructed by a single metal plate member such as for example a stainless steel plate, having a sufficient high rigidity and a relatively large thickness of for example about 100 μm, or by two metal plate members of a main metal plate and a partial reinforce metal plate 10b such as for example stainless steel plates.

The plate spring 11 is constructed by a single elastic metal plate member such as for example a stainless steel plate, having a thickness of for example about 20–25 μm. The dimple ball 19 fixed to the top end section of the plate spring 11 is constructed by a sphere shaped member of stainless steel with a diameter of about 300 μm. This sphere shaped member pushes the magnetic head slider 12 through the flexure 20 so as to apply a load to the slider 12. Instead of the sphere shaped member, the dimple ball 19 may be formed by a hemisphere shaped member (dimple half ball).

The magnetic head slider 12 is adhered to the flexure 20. Terminal electrodes of the magnetic head slider 12 are ball-bonded to connection pads (not shown) of a conductor member formed on the flexure 20 by Au balls 23. A thickness of this magnetic head slider 12 is as a mere example about 300 μm. A broken line 24 shown in FIG. 3 indicates a member for supporting the flexure 20 from its rear surface during the Au-ball bonding process.

The flexure 20 is constructed by a single elastic metal plate member such as for example a stainless steel plate, having a thickness of for example about 20–25 μm so as to give stability to flying attitude of the magnetic head slider 12. On the flexure 20, the conductor member including trace conductors and the connection pads for the magnetic head element is formed.

The horizontal bearing mechanism 17 has, as shown in FIG. 3, a bearing structure that includes a fixed part 17a formed by an outer pipe and a rotationally movable part 17b formed by an inner cylinder coaxially located with the outer pipe. The arm member 10 is fixed to the rotationally movable part 17b by the screw 18. A male thread 17c is formed on the outer surface of the fixed part 17a, and a female thread 17d corresponding to the male thread 17c is formed in the housing 13 of the magnetic disk drive apparatus. Turning of the fixed part 17a of the bearing mechanism 17 allows adjustment of a distance between the arm member 10 and the surface of the magnetic disk 14, that is, adjustment of a Z-height.

Figure 4:
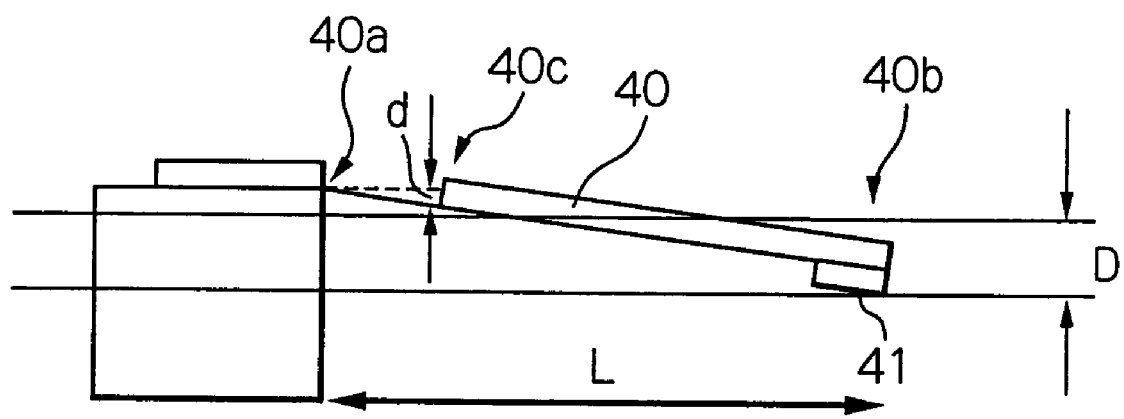
FIG. 4 illustrates why a Z-height adjustment mechanism is to be mounted to the HAA, using a conventional suspension.

FIG. 4 illustrates why such Z-height adjustment structure is to be mounted to the HAA, using a conventional suspension.

As will be noted from the figure, in a typical conventional suspension, a distance L between a bending section 40a of a load beam 40, which generates a load, and a top end 40b of the load beam 40, at which a magnetic head slider 41 is mounted, is long. Thus, even if the Z-height adjustment is performed in the typical suspension by shifting the location of the top end 40b of the load beam 40 for a distance D, a resulting moved amount d at a back end 40c of the load beam 40, which in fact determines the load is small. That is a change in the load depending upon the change in the Z-height is quite small.

However, in the present invention, since the plate spring 11 is short in its length and formed to cover only the top end section of the arm member 10, it is impossible to provide a large distance L. Thus, if the Z-height adjustment is performed by shifting the location of the top end of the plate spring 11, the load will greatly change depending upon the shifting amount. Therefore, it is desired to mount in the horizontal bearing mechanism 17 a Z-height adjustment structure that is capable of easily performing Z-height adjustment without changing the load applied to the magnetic head slider 12. Such Z-height adjustment structure provided in the horizontal bearing mechanism 17 allows easy Z-height adjustment with reference to an upper surface of the magnetic disk 14 after assembly of the HAA into the magnetic disk drive apparatus. Thus, easy compensation of deviations or tolerances due to assembly of the VCM into the magnetic disk drive apparatus, a height of the VCM, thickness of a spacer or the magnetic disk, assembly of the bearing mechanism 17 into the magnetic disk drive apparatus, and a height of the bearing mechanism 17 itself can be expected.

FIGS. 5a to 5c illustrate an assembly process of the HAA in the embodiment of FIG. 2.

First, as shown in FIG. 5a, a dimple ball 19 or a dimple half ball 19' is fixed by a laser beam welding to a top end section of a resilient stainless steel plate member for a plate spring 11.

On the other hand, as shown in FIG. 5b, a reinforcing plate 10b of a stainless steel plate member is fixed by a laser beam welding to a rear end section of a high-stiffness stainless steel plate member for an arm member 10 as required. To the rear end section of this arm member 10, a coil 16 of a VCM is adhered.

As shown in FIGS. 5b and 5c, a rear end section of the plate spring 11 provided with the dimple ball 19 (or the dimple half ball 19') is fixed by a laser beam welding or by using a resin adhesive to one surface of the arm member 10 (the other surface of this arm member will face the magnetic disk) at its top end section. A rear end section of a resilient stainless steel plate member for a flexure 20 is fixed by a laser beam welding to the other surface of the arm member 10 at its top end section.

Then, a magnetic head slider 12 is mounted on the flexure 20 to complete an HAA.

As aforementioned, according to this embodiment, the arm member 10 has no bending section for generating a load, a high stiffness and high resonance frequency can be provided to the HAA. Thus, a frequency range for a servo mechanism such as the VCM can be broadened and therefore high speed operation of the servo mechanism can be expected.

Also, the plate spring 11 for applying a load to the magnetic head slider 12 is arranged in parallel at the top end section of the high-stiffness arm member 10 and this resilient plate spring 11 has no component except for the dimple ball 19 at its top end section, it is possible to greatly increase a resonance frequency of the plate spring 11.

Furthermore, because the arm member 10 has no swaging part used for attaching the conventional suspension to the conventional support arm, it is possible to decrease the thickness of the arm member itself and to prevent its weight from increasing. Therefore, the HAA of this embodiment will have the similar degree of resonance characteristics as the conventional support arm. This means that the HAA of this embodiment does not have a resonance occurred in the conventional suspension.

Since the arm member 10 that has the largest side area is formed in the high rigidity structure, the influence of lateral wind generated by the high speed rotation of the magnetic disk can be minimized. Particularly, in a recent high end magnetic head drive apparatus in which a magnetic disk will rotate at a high speed of 10,000 to 15,000 rpm or more, this feature is very advantageous.

Also, because the arm member 10 has no bending section for generating a load and thus has a high stiffness, it is possible to prevent backward bending from occurring. Thus, a resistance against a Z-direction impact can be extremely improved. Further, since the magnetic head slider is placed in a narrow space between the arm member 10 and the magnetic disk and therefore an up-and-downward moving amount of the magnetic head slider decreases, the resistance of the HAA against a Z-direction impact improves.

Furthermore, according to this embodiment, the number of components for assembling the HAA is reduced and also no process of forming a bending section for generating a load and no swaging process of fixing a suspension to a support arm are necessary. Therefore, not only the manufacturing process can be simplified to reduce the manufacturing cost but also the load can be precisely adjusted to reduce a tolerance in the load.

Still further, since Z-height adjustment structure is provided in the horizontal bearing mechanism 17, compensation of deviations or tolerances due to thickness of members can be performed and precise Z-height adjustment with reference to an upper surface of the magnetic disk can be performed. This is equivalent to reduction of deviations or tolerances due to the load.

In the aforementioned embodiments, an HAA with a thin-film magnetic head element and a magnetic disk drive apparatus are described. However, it is apparent that the present invention can be applied to an HAA with a head element such as an optical head element other than the thin-film magnetic head element and a disk drive apparatus with the HAA.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head arm assembly comprising:
   a head slider having at least one head element;
   a high-stiffness arm member generating no load;
   a flexure with one end section fixed to one end section of said arm member, said flexure being fixed to said head slider and having a resilience for determining flying attitude of said head slider, a top end of said flexure being positioned back from a top end of said arm member;
   an actuator, mounted to the other end section of said arm member, for rotationally moving said arm member in a direction substantially parallel with a recording medium surface around a horizontal rotation axis of said arm member; and
   a resilient plate spring for generating a load, said plate spring having one end section fixed to said arm member and the other end section provided with a load point that is not fixed to but abutted to said flexure for energizing said head slider in a direction to the recording medium surface, a top end of said plate spring being positioned back from the top end of said flexure.

2. The head arm assembly as claimed in claim 1, wherein said one end section of said plate spring is fixed to a first surface of said arm member, a second surface of the arm member facing the recording medium surface, and wherein said one end section of said flexure is fixed to said second surface of said arm member.

3. The head arm assembly as claimed in claim 1, wherein said horizontal rotation axis is provided at a horizontal bearing section located at a midpoint of said arm member, and wherein said horizontal bearing section has means for adjusting a distance between said arm member and said recording medium surface.

4. The head arm assembly as claimed in claim 1, wherein said at least one head element comprises at least one thin-film magnetic head element.

5. The head arm assembly as claimed in claim 1, wherein said resilient plate spring has a dimple ball fixed to a top end section thereof.

6. The head arm assembly as claimed in claim 5, wherein said dimple ball pushes the head slider through the flexure to apply the load to the head slider.

7. A disk drive apparatus including at least one information recording disk, and at least one head arm assembly that comprises:
   a head slider having at least one head element;
   a high-stiffness arm member generating no load;
   a flexure with one end section fixed to one end section of said arm member, said flexure being fixed to said head slider and having a resilience for determining flying attitude of said head slider, a top end of said flexure being positioned back from a top end of said arm member;
   an actuator, mounted to the other end section of said arm member, for rotationally moving said arm member in a direction substantially parallel with a surface of the information recording disk around a horizontal rotation axis of said arm member; and
   a resilient plate spring for generating a load, said plate spring having one end section fixed to said arm member and the other end section provided with a load point that is not fixed to but abutted to said flexure for energizing said head slider in a direction to the surface of the information recording disk, a top end of said plate spring being positioned back from the top end of said flexure.

8. The disk drive apparatus as claimed in claim 7, wherein said one end section of said plate spring is fixed to a first surface of said arm member, a second surface of the arm member facing the recording medium surface, and wherein said one end section of said flexure is fixed to said second surface of said arm member.

9. The disk drive apparatus as claimed in claim 7, wherein said horizontal rotation axis is provided at a horizontal bearing section located at a midpoint of said arm member, and wherein said horizontal bearing section has means for adjusting a distance between said arm member and the surface of said information recording disk.

10. The disk drive apparatus as claimed in claim 7, wherein said at least one head element comprises at least one thin-film magnetic head element.

11. The disk drive apparatus as claimed in claim 7, wherein said resilient plate spring has a dimple ball fixed to a top end section thereof.

12. The disk drive apparatus as claimed in claim 11, wherein said dimple ball pushes the head slider through the flexure to apply the load to the head slider.

* * * * *